Nov. 24, 1931.    R. C. ROE    1,833,130
AIR PREHEATER
Filed Dec. 9, 1929
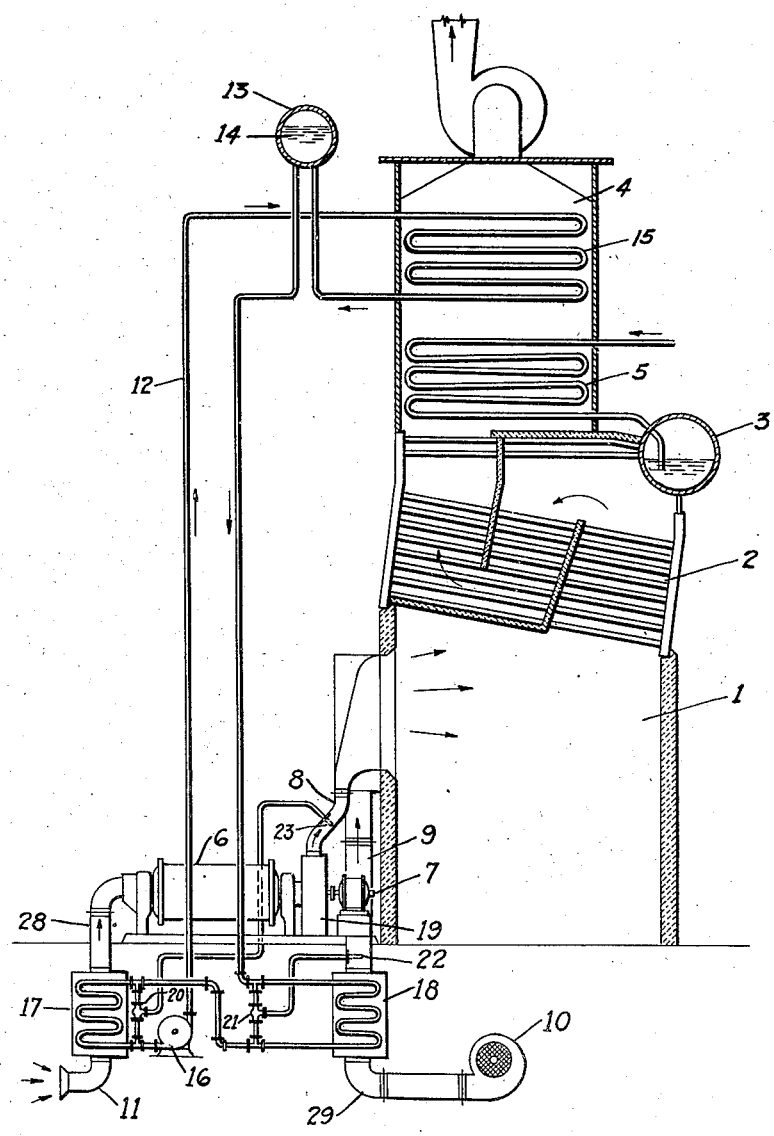
Ralph C. Roe
INVENTOR Patented Nov. 24, 1931

1,833,130

UNITED STATES PATENT OFFICE

RALPH C. ROE, OF ENGLEWOOD, NEW JERSEY, ASSIGNOR OF ONE-HALF TO STEPHEN W. BORDEN, OF SUMMIT, NEW JERSEY

AIR PREHEATER

Application filed December 9, 1929. Serial No. 412,896.

My invention relates to air preheaters for combustion apparatus. including combustion engines, regardless of the fuel used or the method of firing, but particularly to boiler plants burning fuel upon stokers, oil, gas or pulverized fuel, and still more particularly to plants burning pulverized fuel where the air for combustion is divided into primary and secondary air and preheated before entering the furnace.

The object of my invention is to provide a system for transferring heat from the boiler flue gases to the furnace air which will be more flexible, less costly, will occupy less boiler room space and less space in the flue gas passages, will be less subject to deterioration and will allow a more logical arrangement of the forced draft fans, etc., than the usual present day air heating system. A further object of my invention is to provide a heat transfer system in which the heat transfer per square foot of flue gas heating surface and the heat liberation per square foot of the air heater surface will be greater than in any present svstem and also to provide a system which will permit of accurate and convenient regulation of the heat delivered to the primary and secondary air respectively.

The present commercial method of preheating furnace air is either by passing the air and the furnace flue gas through alternate zones or passages. the air and gas being separated by metal walls and the heat transfer taking place through these walls; or by alternately placing metal members first in the path of the hot flue gas and then in the path of the furnace air stream, this being accomplished by a continuous process in which either the metal itself is alternately moved from the gas to the air and back again or the gas stream and the air stream are alternatively caused to flow through a common metal passage. Both of these methods require that the air to be heated and the flue gas be located in or pass through the same air heater, which predetermines the location of the air heater at a point where the flue gas is available. This usually results in the location of the air heater at points high in the boiler room and the forced draft fan is usually similarly placed, (inasmuch as it is more efficient to allow the fan to handle cold air than to handle air after it has been heated). It is then necessary to conduct this heated air to the furnace, in many cases a considerable distance, in large and expensive metal ducts.

These air ducts are necessarily relatively large and expensive. For instance, in a power plant of 25,000 kilowatt capacity, the ducts would have to have an area of approximately 60 square feet. The space requirements in the flue gas stream are very considerable. After the ducts leave the heater, they must be heavily lagged to prevent the loss of heat by radiation since the air may be heated to a temperature of 500 degrees Fahrenheit or more. The lagging still further increases the size and cost of the duct system and the amount of boiler room space occupied by these ducts is very considerable. The air heaters in the flue gas stream are subject to serious deterioration from the hot flue gases and both the limitation of space and the cost prohibit the use of heavy metal construction such as is inherent in ordinary piping systems, and which is more suitable for use in the flue gas stream.

These difficulties are greatly reduced or entirely eliminated by my system of transferring heat from the flue gas to the furnace air. The manner by which this is accomplished, the method of operation of my invention, and the apparatus for carrying out my invention will become apparent from a consideration of this description taken in conjunction with a consideration of the accompanying drawings, whereon I have illustrated one plant arrangement, it being understood, however, that this description of one plant is for illustrative purposes only and that the invention is not limited to any particular plant arrangement.

Referring to the accompanying drawing:—

The figure is a schematic layout of a boiler plant in which 1 is a combustion chamber; 2. the boiler tubes; 3, the boiler drum; 4, the flue gas discharge passage; 5, economizer coils; 6, pulverizing mill; 7, motor for driving the primary blower and mill; 8 and 28, the primary air inlet duct to the furnace; 9 and 29, the secondary air duct to the furnace; 10, the secondary air fan; 11, primary inlet; 12, a closed piping system; 13, an expansion tank; 14, liquid in the expansion tank; 15, heat absorber; 16, a circulating pump; 17 and 18, air heaters; and 19, a primary air blower; 20 and 21, valves and 22 a thermostat.

The piping system 12 consists of ordinary pipe which may be of any quality suitable for the purpose required. Piping system 12, the absorber 15 and heaters 17 and 18, the pump 16 and expansion tank 13 compose a closed system which system is filled with a heat vehicle as glycerine, the whole constituting a heat transfer circuit. The expansion tank 13 may be comparatively small, its exact dimensions depending upon the particular liquid used in the system. The absorber 15 may be of any construction suitable for the pressures required and for placement in the flue gas steam. The heaters 17 and 18 may be of any conventional heat transfer type. The absorber and the heaters are designed for whatever terminal temperature difference and with whatever heating surface area may be dictated by the particular situation involved. The pump 16 may be a simple motor driven centrifugal pump producing sufficient pressure to overcome the friction losses in the piping system, the absorber 15 and heaters 17 and 18. The fan 10 is an ordinary air fan producing sufficient pressure to overcome the friction losses in heater 18, ducts 9 and 29, the furnace inlet resistance and such excess pressure as may be desired for any particular furnace.

The operation of my system is as follows:—

The primary air flows into the inlet 11, through heater 17, duct 28, the pulverizing mill 6, primary fan 19 and the duct 8 to the furnace due to the action of the primary fan and to the pressure of the normal boiler draft. The secondary air is drawn in by fan 10 and forced through heater 18 and duct 9 to the furnace.

The glycerine is circulated through the heat transfer circuit by pump 16.

The absorber 15 is designed to transfer, from the flue gases to the glycerine, whatever amount of heat will be required by the primary and secondary air. The heater 18 is designed to transfer to the secondary air the amount of heat required for that air while heater 17 is designed to deliver to the primary air whatever amount of heat is required by that air. All three of the heaters are of simple and ordinary design and easily calculated and constructed by one skilled in the heater art. It may be said that in general the absorber 15 will require less heating surface than the economizer 5 and will require a great deal less space than would be the case if the heater were arranged in the conventional manner to transfer heat from the flue gases to the air directly.

While I have shown the two heaters 17 and 18 connected in series, it will be understood that they may be connected in multiple and the amount of heating fluid passing through each heater, whether connected in series or multiple, may be readily controlled by means of the valves 20 and 21 which valves may, if desired, be controlled by thermostatic means, as 22, located in the air ducts.

The flue gas leaving the economizer will be at such temperature as is left after heat absorption of the preceding economizer and boiler surfaces, but for the purpose of illustration is assumed to be 535 degrees Fahrenheit and it is assumed that we desire to heat the secondary air to approximately 500 degrees Fahrenheit and primary air to 300 degrees Fahrenheit. The boiling point of glycerine is 554 degrees Fahrenheit at atmospheric pressure and in the case illustrated the pressure would not necessarily have to be higher than atmospheric pressure.

The pressure which would be maintained on the heat transfer circuit would depend upon the liquid used and the temperatures involved. As will be seen from the preceding paragraph, with ordinary temperatures and with glycerine as a liquid, there is no need of maintaining a pressure greater than atmospheric pressure since the liquid will not vaporize under the circumstances. If, however, it is found desirable, in any particular case, to use a liquid having a lower atmospheric boiling point or it is desired to heat the air to higher temperatures, it will be necessary to place the liquid under pressure in order to increase its boiling point.

There are a number of liquids suitable for use in the heat transfer circuit such as ethylene glycol $[CH_2(OH).CH_2(OH)]$ which has a boiling point of 388 degrees Fahrenheit at atmospheric pressure and mercury which has a boiling point of 675 degrees Fahrenheit at atmospheric pressure, linseed oil, olive oil and solar oil, all of which have a sufficiently high boiling point for the purpose. There are also a number of solutions of water and salts which have very high boiling points. Even water, if under sufficient pressure, would be suitable but the pressure would have to be very high.

Since, for mechanical reasons, it is desirable to install nothing less than commercial 150 lb. piping for the heat transfer circuit, it is apparent that the liquid in the circuit may be operated under any pressure up to 150 lbs. per square inch without increasing the cost of the system. It is also apparent that as soon as the liquid reaches the boiling point it will tend to vaporize and automatically will produce a pressure on the system which will automatically raise the boiling point and we are, therefore, limited in our selection of liquids only to those whose boiling points, at a pressure of 150 lbs. per square inch, are not lower than the temperature to which the liquid is to be heated by the flue gas. With the various liquids available and within the pressure limits of 150 lbs. per square inch, it is possible to provide a combination of liquid and pressure suitable for such temperature conditions as are found in commercial practice today. However, any pressure may be used for which suitable pipe and fittings are obtainable.

Under some circumstances it is desirable to preheat the air to relatively high temperatures. In such cases, instead of employing the relatively high pressures which might be necessary to prevent the vaporizing of the heat vehicle, the heat vehicle may be permitted to vaporize in the heat absorber and to flow as a vapor to the air heater where it may be condensed and the condensate returned to the absorber. However, in order that one of the principal objects of this invention, namely, that of greater reducing the size of the ducts necessary, may not be lost, it is essential that the vapor be of such character that it will absorb, transport and liberate a relatively large amount of heat per cubic foot. Mercury vapor is of such character but mercury is a very expensive substance.

The specific gravity of mercury is approximately 13.58 and the specific heat is .033 and at atmospheric pressure the latent heat of mercury is 122.16 B. t. u. The vaporizing point at this pressure is 674.5. Therefore, it is readily seen that if temperature of approximately the latent heat temperature of the vapor were acceptable, that the vaporizing and corresponding condensing of one pound of mercury would transmit as much heat as would an increase and decrease in temperature of 100 degrees in thirty-eight pounds of liquid mercury. A vaporized pound of mercury, however, would occupy a space approximately ninety times greater than would thirty-eight pounds of liquid mercury. However, this added space requirement in the case of mercury vapor could possibly be made up for by the decreased flow resistance and the increased velocity in the coils and pipe lines.

There are some liquids other than mercury which in certain special cases may be used in the vapor state and under such pressures that the necessary piping system, heaters, etc., will not be prohibitively bulky or expensive but it may be said that, in general, much is to be gained by keeping the heat vehicle in the liquid state. If the necessary working temperatures are so high that this is not feasible without using undesirably high pressures then it becomes a matter of choice as between mercury, with its relatively high substance cost and relatively low cost for piping, heaters, etc., and other liquids with their relatively low substance cost but relatively high cost of piping, heaters, housing space, etc.

In a boiler plant serving a load of 25,000 kilowatts the air ducts for a conventional heater system would have a cross sectional area of about 60 square feet, whereas a piping system, as 12, would not be larger than 8 inch pipe size. The pump 16 would require very little power for its operation, inasmuch as it has to overcome relatively light friction losses in the piping and heaters and the fan 10 would require a great deal less horsepower than would be the case with the usual conventional heater system.

The use of my system, as compared with the duct system, results in decreasing the over all dimensions of the flue passages of the boiler and also in decreasing the necessary height of the boiler room and in some cases the area, and in any case it releases much space in the boiler room for other purposes. It is possible in this system to locate the forced draft air fan in the most convenient location as its location is not dictated by the location of the flue gas air heater. The system is much less expensive to construct than an equivalent air duct system.

In the conventional air heater, the metal of the air heater is raised to a temperature which is considerably higher than the temperature of the air being heated and more nearly approaches that of the gas doing the heating. In my system the temperature of the metal will more nearly approach that of the fluid in the system, which is desirable, inasmuch as it allows higher temperature operation without resorting to alloy and expensive metals. In the conventional air heater, on account of the large surfaces involved, for economic reasons they are usually built of comparatively thin sheet metal, whereas in my system, because of the smaller quantity of heating surface required and the tubular construction, the heater may be economically built of heavier metal and will be of more rigid construction and far better able to withstand the flue gas temperatures and corrosion than the sheet metal construction.

It will be observed that my system contains the three principal elements of other systems, namely, the air to be heated, flue gas from which heat is taken and metal surfaces absorbing heat from the flue gas and delivering heat to the air, but to these I have added a fourth element, namely, a liquid heat vehicle. The characteristics of the liquid which are of great value are its ability to take up and to give off a greater amount of heat per square foot of heating surface than gas, this being due to its higher specific heat, and its higher specific gravity which makes it feasible to control the velocity of the liquid along the surfaces by a suitable arrangement of the surfaces and by pumping, all of which results in smaller and less expensive absorbers and heaters and greater flexibility of design.

While the heat absorber 15 is shown as a conventional heating coil, which it may be, it is to be understood that the heat absorber may assume other forms such for instance as a hollow metallic flue gas discharge passage with the fluid of my preheating system circulating through the hollow walls. It is only necessary for the purposes of this invention that the absorber be capable of withstanding the destructiveness of the hot flue gases and of imparting the necessary heat to a fluid placed in heat transfer relation therewith.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of my invention is to be gauged by the accompanying claims taken in connection with the state of the prior art.

What I claim is:—

1. Apparatus for preheating furnace air comprising a heat absorber, a primary air heater, a secondary air heater, piping for interconnecting the absorber and the heaters, means for circulating a heat vehicle through the piping and through and between the absorber and the heaters and means for regulating the flow of the heat vehicle through the respective heaters.

2. An air preheating system for a furnace for preheating the primary and secondary air supplied to the furnace through flues for combustion therein, which includes a heat absorber located in the flue gas discharge passage of the furnace, a heater located in the secondary air flue to the furnace, a second heater located in the primary air flue to the furnace, a piping system interconnecting the two heaters and the absorber and means for circulating a fluid through the absorber, the piping system and the heaters.

3. An air preheating system for a furnace for preheating the primary and secondary air supplied to the furnace through flues for combustion therein, which includes a heat absorber located in the flue gas discharge passage of the furnace, a heater located in the secondary air flue to the furnace, a second heater located in the primary air flue to the furnace, a piping system interconnecting the two heaters and the absorber and means for circulating a fluid through the absorber, the piping system and the heaters, the absorber and the heaters being so connected by means of the piping system that the fluid passes from the absorber to and through the heater in the secondary air flue, thence to and through the heater in the primary air flue and thence back to and through the heat absorber.

In testimony whereof I have signed my name to this specification.

RALPH C. ROE.